United States Patent [19]

Waters

[11] 4,021,193

[45] May 3, 1977

[54] SPOUTED-FLUIDIZED BED REACTOR SYSTEMS

[75] Inventor: Percy Lloyd Waters, North Ryde, Australia

[73] Assignee: Commonwealth Scientific and Industrial Research Organization, Campbell, Australia

[22] Filed: July 24, 1975

[21] Appl. No.: 598,823

[30] Foreign Application Priority Data

July 26, 1974 Australia ............................ 8342/74

[52] U.S. Cl. .................................. 432/58; 34/57 A
[51] Int. Cl.² .................... F27B 15/00; F26B 17/00
[58] Field of Search .................... 432/14, 15, 58; 34/57 A

[56] References Cited

UNITED STATES PATENTS

| | | | |
|---|---|---|---|
| 2,607,666 | 8/1952 | Martin | 432/58 |
| 2,985,439 | 5/1961 | Scivally et al. | 432/58 |
| 3,091,594 | 5/1963 | Borey | 34/57 A |
| 3,417,978 | 12/1968 | Suzukawa et al. | 34/57 A |
| 3,443,621 | 5/1969 | Dubreuil | 34/57 A |
| 3,617,037 | 11/1971 | Foch | 432/58 |
| 3,756,922 | 9/1973 | Schmalfeld et al. | 34/57 A |
| 3,861,862 | 1/1975 | Steever | 34/57 A |

*Primary Examiner*—John J. Camby

[57] ABSTRACT

A spouted fluidized bed reactor for use in the incineration or other treatment of materials comprises a particulate bed, at least one nozzle projecting into the lower region of the bed and means to pass air or other fluid into the bed through the nozzle with sufficient velocity to cause a region of the bed above the nozzle to become fluidized, either (a) the bed being sufficiently deep that a spouted bed is formed above the nozzle with a region of fluidization of the bed above the spouted bed region, or (b) a spouted bed is formed above the nozzle and sufficient air or other fluid is fed to the lower region of the bed adjacent or surrounding the nozzle to maintain the particles of the stagnant region of the spouted bed in a state of incipient fluidization.

13 Claims, 5 Drawing Figures

SPOUTED-FLUIDIZED BED REACTOR SYSTEMS

This invention concerns a novel concept in fluidised bed combustion, in which a combination of "spouted" and "fluidised" bed is used, with the fluidised bed either above the spouted bed or incipient in the stagnant zone of it. This combined type of bed has particular application to the combustion of industrial wastes, but is not limited to this application.

Fluidised beds are known to be used for combustion of volatile products in special circumstances where routine combustion techniques are not applicable. For example, the removal of combustible insulation from electric components can be effected in a fluidised bed. Incineration of waste products in a fluidised bed has also been suggested, one arrangement for such combustion being described and illustrated in the specification of U.S. Pat. No. 3,524,633. Spouted beds are also known, being used for grain drying and peanut roasting. A recent review of the state of the art for spouted beds appeared in a paper in the "Canadian Journal of Chemical Engineering", Vol. 52, April 1974, by K. B. Mather and N. Epstein entitled "International Symposium on Spouted Beds".

Combustion of fuels in a conventional fluidised bed has been found to exhibit a number of disadvantages. One of these, when liquid hydrocarbons or coal are injected into the side of the fluidised bed, is that the volatile matter tends to produce bubbles of combustible gas which rise through the bed without proper combustion with the air in the bed. Not only does this represent an inefficient use of the bed, but the bubbles of gas, when mixed with air in the region over the bed, give rise to unwanted combustion in this region, sometimes with explosive violence. Alternatively, some of the volatiles escape unburnt. To overcome this problem of incomplete combustion relatively deep beds have been used, but these require high air pressures for fluidisation and thus additional power for the fans or the like providing the fluidising pressure.

Another disadvantage of conventional fluidised beds is that the particles comprising the bed move mainly up and down rather than across the bed. With little lateral movement of the particles, when, for example, coal is injected into the bed, it does not disperse rapidly across the bed, the fuel distribution relative to the air is uneven and combustion conditions are unsatisfactory.

A further disadvantage of conventional fluidised beds is that the particles in the bed are generally required to be smaller than about ⅛ inch in diameter, and preferably in the size range of −30 +150 mesh (B.S.S.).

A prime objective of the present invention in the field of combustion is to overcome these disadvantages of conventional fluidised beds in the incineration of industrial wastes.

In general, this objective is sought by creating either (a) a spouted-fluidised bed combustor, in which the air and combustible material are fed into a deep particulate bed through a single aperture, so that the bed is spouted near the inlet air nozzle, but exhibits normal fluidised bed operation well above the spout, or (b) a spouted bed with the additional feature of a supply of gas (usually air) sufficient to bring the stagnant particles below the agitated cone of the spouted bed into a state of incipient fluidisation.

According to the present invention, there is provided a spouted-fluidised bed reactor for use in the incineration or other treatment of material which comprises a particulate bed, at least one nozzle projecting into the lower region of the bed, and means to pass air or other fluid into the bed through the nozzle with sufficient velocity to cause a region of the bed above the nozzle to become fluidised, characterised in that either (a) the bed is sufficiently deep that a spouted bed is formed above the nozzle with a region of fluidisation of the bed above the spouted bed region; or (b) a spouted bed is formed above the nozzle and additional air or other fluid is fed to the lower region of the bed at a point or points adjacent or surrounding the nozzle at sufficient velocity to maintain the particles of the stagnant region of the spouted bed in a state of incipient fluidisation.

The nozzle may be let into either the base or side of the reactor vessel containing the bed, and may include either a single aperture or a plurality of smaller secondary apertures located around a main aperture to admit tertiary air into the bed.

Normally the nozzle will be connected to a main feed pipe, through which air or other fluid will be supplied by the action of fans of the type commonly used with fluidised beds, and the main feed pipe will contain one or more secondary feed pipes or channels through which the secondary material, in particulate, liquid or gaseous form, may be supplied to the nozzle.

The aperture of the nozzle may be any suitable shape and where appropriate, a plurality of such nozzles can be distributed in an extensive bed, each able to create its own agitated or spouted portion of the bed independently of the others. Such an arrangement increases the versatility of the reactor system.

Water may also be supplied to the bed, for example for cooling purposes in the case of combustion, through a secondary feed pipe.

Where the reactor of the present invention is to be used in the incineration or other treatment of materials, such materials are preferably introduced into the spouted region of the bed, particularly the region close to the single aperture nozzle.

These materials may be introduced, for example, by entraining them in the feed of air or other fluid and secondary material to the nozzle. Alternatively, these materials may be fed by a separate feed arrangement directly into the spouted region of the bed near to the nozzle.

A description of embodiments of the present invention will now be given. For convenience, reference will only be to the use of the invention as an incinerator or combustor, but it will be appreciated that the invention is not limited thus in its use.

Figure 1:
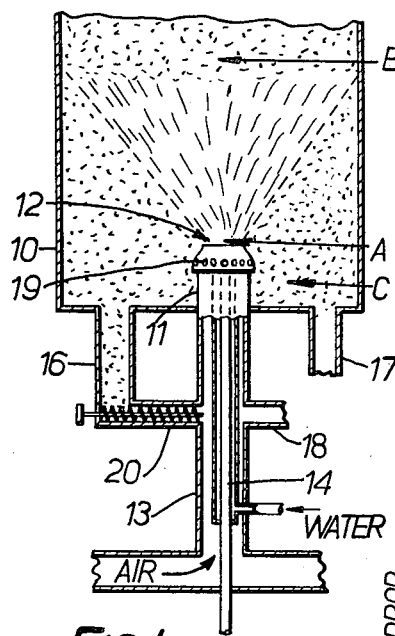
FIG. 1 shows schematically a typical spouting/fluidised bed combustor in accordance with the present invention with a return system for recycling burnt material for preheating the air and dispersing the feedstock.
Figure 2:
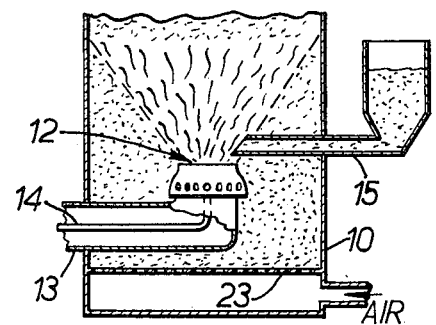
FIG. 2 illustrates the alternative form of the combustor of the present invention, and incorporates a supply of air for incipient fluidisation of the lower stagnant region of the bed.

Referring to FIG. 1, a vessel 10 contains a bed of hot refractory particles at a temperature in the range of from about 750° to 1200° C. Sand, burnt shale and ash are typical materials used. A nozzle 11 projects into this bed, terminating in a single aperture 12. Nozzle 11 may, as shown in FIG. 1, enter the vessel through its base or, as illustrated in FIG. 2, it can be let in through the side of vessel 10. In another alternative construction, the nozzle may be let into the side wall of the vessel containing the bed, in which case there is substantially no extension of the main feed pipe into the bed.

Air and fuel flow through separate ducts 13 and 14, respectively, to the nozzle aperture 12 and thence into the bed. The flow of air through the aperture causes the particles in the bed to undergo a spouting action. That is, the particles in a cone above the aperture 12 are entrained, while particles lying outside the region of the cone remain static. With shallow beds, the spouting action creates a fountain of particles. Deeper beds exhibit spouting behaviour with very high circulation rates of solid particles within the cone of activity. With the addition of air to promote incipient fluidisation of the particles outside the region of the cone, this arrangement is one basic form of the pesent invention. With deeper beds, for example, beds deeper than about 65 cms., the spout becomes submerged under a fluidised bed of particles. This represents another basic form of the present invention.

The rapid circulation of hot particles within the spout region provides good conditions for the ignition and stable combustion of the fuel, for the strong turbulence mixes the fuel and air very efficiently.

If solids (such as crushed coal particles) are introduced into the feed to the nozzle, they are rapidly distributed across the area of the active cone of the bed. When combustible, these particles can take the place of the normal fuel supply to the bed to keep it hot. The larger particles will tend to reside and agitate in the region A of FIG. 1, where the velocity of air from the nozzle is high. The smaller particles will be carried into the low air velocity region B. The region C in FIG. 1 contains stagnant particles, or is incipiently fluidised. As the superficial air velocity in region B is typically in the range from about 0.5 m. $sec^{-1}$ to 2.0 m. $sec^{-1}$, it is possible for particles up to 20 mm. in diameter to be supported in this part of the spout and burnt. As mentioned above, such particles are not kept in suspension in normal fluidised beds, but sink to the bottom.

The gas velocity at the actual aperture of the nozzle is generally between 10 m. $sec^{-1}$ and 80 m. $sec^{-1}$. An advantage of such high velocities is that they enable the dispersion and disintegration of large agglomerates of waste materials, such as slurries and sludges. Such agglomerates may be fed directly into the bed near to the nozzle, as shown by feed arrangement 15 of FIG. 2. Alternatively, they may be fed into the inlet air duct portion 13 via feed pipe 18, as shown in FIG. 1.

It is sometimes advantageous to preheat the air entering the bed to promote combustion or for other purposes (e.g., pre-heating steam in the case where the reactor is to be used for gasification purposes). One method of achieving this is illustrated in FIG. 1, where the hot solids from the stagnant region of the bed, C, move down a downcomer 16 and are injected into the air riser secondary feed pipe of nozzle 11, using any suitable injector 20. These hot particles transfer heat to the surrounding air during their movement back into the bed through nozzle 11. A preheating temperature of about 400° C can be readily achieved by this technique.

If the particle bed builds up due to the accumulation of burnt residues in particulate form, the excess of particles may be withdrawn from the bed through a downcomer 17.

If the temperature of the bed increases during the combustion to an unacceptable value, the bed can be cooled by the addition of water, which in many cases can conveniently be blended with the liquid fuel or introduced into the inlet air duct through a separate secondary feed pipe.

Figure 5:
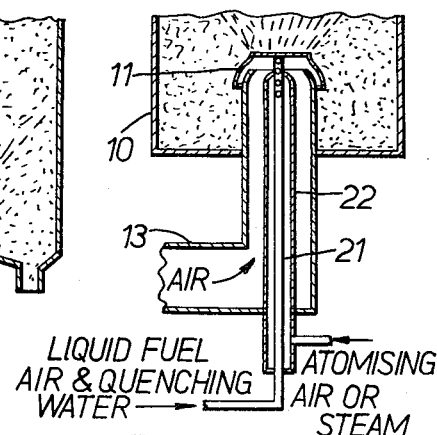
FIG. 5 illustrates a preferred form of burner for combustion of liquid fuels and wastes in a reaction of the present invention.

Using liquid fuels and liquid waste products, the burner arrangement illustrated in FIG. 5, incorporating an atomiser, may be adopted with advantage. The liquid fuel is fed to the nozzle through a central pipe 21, with or without air being included in the fuel, having a non-return ball valve at the outlet thereof. The main air supply is as shown in other embodiments of the combustor, but atomising air and/or steam can be fed to the nozzle 11 through a concentric tube 22. This type of arrangement is used in some conventional liquid fuel fired burners. Liquid hydrocarbons have been effectively burnt with this system using only about 1 to 3% excess oxygen in the flue gas (i.e., about 1.1 excess air factor).

Figure 3:
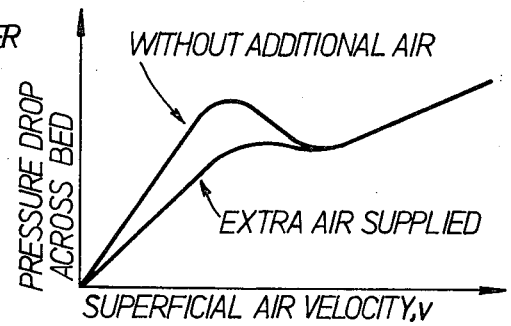
FIG. 3 is a graph showing how the pressure required to cause fluidisation of the region above the nozzle of a reactor of the type shown in FIGS. 1 and 2 varies with nozzle construction.

Another advantageous modification of the combustor is to include peripheral holes 19 in the uppermost part of the nozzle 11, which defines the aperture 12. Tertiary air can escape through these holes into the particulate bed, and tends to fluidise the bed in the region of these holes. This, in turn, means that less air pressure is required in the initial start-up of the bed in the case of the spouted-fluidised incinerator as shown in FIG. 3. Once the spout and fluidised bed are established, these peripheral holes supply tertiary air to the particle bed.

If a spouted bed alone, without the overlying fluidised bed region, is to be used, air is supplied over the lower region of the bed to create a state of incipient fluidisation in the otherwise stagnant particles in the bed. Such a situation is shown in FIG. 2, in which air supplied to the reactor 10 below the lower region of the particle bed, is supplied over that region of the bed through a perforated or similar base 23. By supplying the extra air, a constant transfer of particles into the spout above the nozzle is achieved, thus ensuring full combustion of all particles in the bed. It also means that lower fan pressure is required to maintain the spouted bed.

Figure 4:
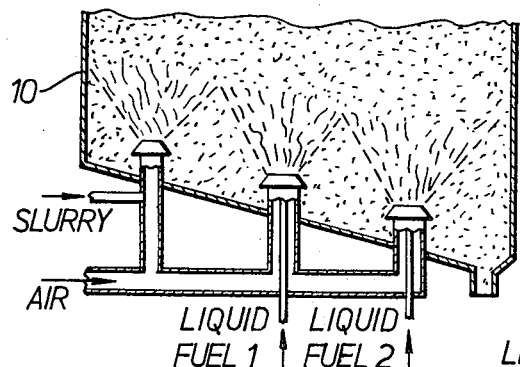
FIG. 4 illustrates how different feedstocks can be introduced through separate nozzles to establish a multiplicity of spouted beds within a single, extensive particulate bed, which may be slightly inclined to assist solids flow.

As foreshadowed above, a multiplicity of burners can be incorporated into an extensive particulate bed as shown by way of illustration in FIG. 4. Preferably, each burner operates independently, although adjacent nozzles will create a common region of stagnant or incipiently fluidised particles below the cone of the spout, and some cross-mixing of particles will occur. In this type of construction, different feedstocks may be simultaneously processed; different wastes or fuels, which might be unable to be blended because they react together, can be simultaneously burnt. The burners need not be in a row in such an arrangement. If the bed is shallow, use of a number of burners in a row, preferably with elongate slots for their apertures 12 (instead of the more common circular apertures) and inclination of the bottom of the vessel containing the bed, provides means to distribute solid fuel (e.g. coal) across the bed which can constitute a "sprinkler stoker".

An alternative arrangement uses horizontal and tangential arrangement of burners in an incipiently fluidised bed to create a cyclonic movement of fluid and particles within the bed and to improve combustion efficiency.

It should be clear to those skilled in this art that a spouted-fluidised bed is of particular value in treatments requiring a longer residence time of gas or solids than can be achieved in a conventional spouted bed, and/or where good gas/solids contact is necessary. It will also be of advantage in any system requiring the contacting of gas with relatively large particles for heat transfer or chemical reactions, good solids agitation, and/or the dispersal of sticky fluids and solids.

Examples of the use of the present invention include the drying and pre-treatment of granular solids and slurries, granulation, particle coating, gas cleaning, pyrolysis in cracking carbonaceous solids and hydrocarbon liquids or gases, the gasification of carbon, iron ore reduction and carbon activation. Other uses will be apparent from a consideration of the foregoing description.

The claims defining the invention are as follows:

1. A spouted-fluidised bed reactor for use in the treatment of materials, comprising:
    a deep particulate bed;
    at least one nozzle projecting upwardly into a lower region of said bed; and
    means to cause a fluid and combustible material to pass into the bed through said nozzle, said fluid having sufficient velocity to cause an inverted cone shaped region of said bed, immediately above said nozzle, to act as a spouted bed, and to cause an upper region of said bed to become fluidised, said bed containing a stagnant region beneath said inverted cone shaped region.

2. A reactor according to claim 1, wherein said nozzle comprises a single aperture.

3. A reactor according to claim 1, and wherein said nozzle comprises a main aperture and a plurality of secondary apertures located around said main aperture to fluidise particles of said bed in the region of said secondary apertures.

4. A reactor according to claim 1, wherein said means to cause said fluid to pass into the bed through the nozzle comprises a main feed pipe through which said fluid and a combustible material is supplied to said nozzle.

5. A reactor according to claim 1, wherein a plurality of said nozzles are provided, each said nozzle being adapted to independently form a spouted region in said bed.

6. A reactor according to claim 1, including means for supplying cooling water to said bed.

7. A reactor according to claim 1, further comprising means for feeding additional fluid into said stagnant region of said bed at points adjacent said nozzle, said additional fluid having sufficient velocity to maintain particles of said stagnant region in a state of incipient fluidisation.

8. A reactor according to claim 1, wherein said means to cause material to be treated to be introduced into the bed comprises means for entraining said material in said fluid passed into the bed through said nozzle.

9. A reactor according to claim 1, including means for preheating said fluid before it is passed into said bed through said nozzle.

10. A reactor according to claim 1, wherein said means to cause fluid to pass into said bed through said nozzle passes said fluid into said bed at a velocity, at the aperture of said nozzle, of between 10 m. sec$^{-1}$ and 80 m. sec$^{-1}$.

11. A reactor according to claim 1, wherein said means to cause fluid to pass into said bed through said nozzle includes means to supply liquid fuel at said nozzle and means to atomise said fuel at said nozzle.

12. A reactor according to claim 1, further including means to cause material to be treated to be introduced into the spouted region of the bed.

13. A reactor according to claim 12, wherein said means to cause material to be treated to be introduced into the bed comprises means for feeding said material directly into said spouted region of said bed adjacent said nozzle.

* * * * *